US012761781B2

(12) United States Patent
Yang

(10) Patent No.: US 12,761,781 B2
(45) Date of Patent: Oct. 13, 2026

(54) METHOD, AND PROGRESS CONTROLS ASSOCIATED WITH PIECES OF TARGET MEDIA CONTENT

(71) Applicant: Beijing Zitiao Network Technology Co., Ltd., Haidian District (CN)

(72) Inventor: Jiahui Yang, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/623,828

(22) Filed: Apr. 1, 2024

(65) Prior Publication Data

US 2024/0241633 A1 Jul. 18, 2024

Related U.S. Application Data

(63) Continuation of application No. PCT/CN2023/083483, filed on Mar. 23, 2023.

(30) Foreign Application Priority Data

Mar. 30, 2022 (CN) ........................ 202210334421.2

(51) Int. Cl.
*H04N 21/472* (2011.01)
*G06F 3/04847* (2022.01)

(52) U.S. Cl.
CPC ... *G06F 3/04847* (2013.01); *H04N 21/47217* (2013.01)

(58) Field of Classification Search
None
See application file for complete search history.

(56) References Cited

U.S. PATENT DOCUMENTS 9,665,529 B1 * 5/2017 Lattyak .................. G09B 17/04
10,511,890 B1 * 12/2019 Ramesh ............ H04N 21/4532
(Continued)

FOREIGN PATENT DOCUMENTS

CN 111586464 A 8/2020
CN 112153454 A 12/2020
(Continued)

OTHER PUBLICATIONS

ISA China National Intellectual Property Administration, International Search Report and Written Opinion Issued in Application No. PCT/CN2023/083483, May 24, 2023, WIPO, 12 pages. Submitted with partial English translation.
(Continued)

*Primary Examiner* — Henry Orr
(74) *Attorney, Agent, or Firm* — Alleman Hall LLP

(57) ABSTRACT

Embodiments of the present disclosure provide a method and apparatus for displaying media content, a device, a storage medium, and a program product. The method comprises: determining, in response to a first trigger operation of viewing first media content, whether the first media content satisfies a preset content association condition, wherein the first media content is contained in a media content stream displayed in a media content display interface; and displaying target media content in the media content display interface in response to determining that the first media content satisfies the preset content association condition, and displaying at least two first progress controls in a preset area of the media content display interface, wherein the target media content comprises the first media content and at least one piece of second media content that is content-associated with the first media content.

17 Claims, 4 Drawing Sheets

(56) References Cited

U.S. PATENT DOCUMENTS

| | | | | |
|---|---|---|---|---|
| 2013/0016129 | A1* | 1/2013 | Gossweiler, III | G06F 1/1694 345/173 |
| 2014/0123005 | A1* | 5/2014 | Forstall | G06F 16/44 715/716 |
| 2015/0030310 | A1 | 1/2015 | Nesbitt et al. | |
| 2015/0113407 | A1* | 4/2015 | Hoffert | H04N 21/482 715/720 |
| 2016/0182965 | A1* | 6/2016 | Peterson | H04N 21/4312 725/37 |
| 2020/0042144 | A1 | 2/2020 | Ekstrand et al. | |
| 2024/0289398 | A1* | 8/2024 | Li | G06F 16/9536 |

FOREIGN PATENT DOCUMENTS

| | | | |
|---|---|---|---|
| CN | 112765375 | A | 5/2021 |
| CN | 112800277 | A | 5/2021 |
| CN | 113157753 | A | 7/2021 |
| CN | 113342226 | A | 9/2021 |
| CN | 113420247 | A | 9/2021 |
| CN | 113784195 | A | 12/2021 |
| CN | 113849258 | A | 12/2021 |
| CN | 114173175 | A | 3/2022 |
| CN | 114760515 | A | 7/2022 |
| WO | 2018103344 | A1 | 6/2018 |
| WO | 2022007724 | 1 | 1/2022 |

OTHER PUBLICATIONS

China National Intellectual Property Administration, Office Action and Search Report Issued in Application No. 202210334421.2, Aug. 22, 2023, 10 pages.

Japan Patent Office, Office Action Issued in Application No. 2024-558115, Mar. 11, 2025, 8 pages.

Japan Patent Office, Notice of Allowance Issued in Application No. 2024558115, Jul. 29, 2025, 6 pages.

* cited by examiner

METHOD, AND PROGRESS CONTROLS ASSOCIATED WITH PIECES OF TARGET MEDIA CONTENT

The application is a Continuation Application of International Patent Application No. PCT/CN2023/083483, filed Mar. 23, 2023, which claims the priority to Chinese Patent application Ser. No. 202210334421.2, filed to the Chinese Patent Office on Mar. 30, 2022, which is incorporated in its entirety herein by reference.

FIELD

Embodiments of the disclosure relate to the technical field of computers, and relate to a method and apparatus for displaying media content, a device, a storage medium, and a program product, for instance.

BACKGROUND

At present, when a user watches a recommended video in its playing interface, he/she/they can switch to another interface, according to reminder information, to view a video in a video collection to which the recommended video belongs.

SUMMARY

Embodiments of the disclosure provide a method and apparatus for displaying media content, a device, a storage medium, and a program product, such that ways of displaying a video collection are enriched.

In a first aspect, embodiments of the disclosure provide a method for displaying media content. The method comprises:

- determining, in response to a first trigger operation of viewing first media content, whether the first media content satisfies a preset content association condition, wherein the first media content is contained in a media content stream displayed in a media content display interface; and
- displaying target media content in the media content display interface in response to determining that the first media content satisfies the preset content association condition, and displaying at least two first progress controls in a preset area of the media content display interface, wherein the first progress controls are associated with the target media content, and the target media content comprises the first media content and at least one piece of second media content that is content-associated with the first media content, and each first progress control is configured to indicate display progress of a piece of the target media content associated with the each first progress control.

In a second aspect, embodiments of the disclosure further provide an apparatus for displaying media content. The apparatus comprises:

- a determination module configured to determine, in response to a first trigger operation of viewing first media content, whether the first media content satisfies a preset content association condition, wherein the first media content is contained in a media content stream displayed in a media content display interface; and
- a first control displaying module configured to display target media content in the media content display interface in response to determining that the first media content satisfies the preset content association condition, and configured to display at least two first progress controls in a preset area of the media content display interface, wherein the first progress controls are associated with the target media content, and the target media content comprises the first media content and at least one piece of second media content that is content-associated with the first media content, and each first progress control is configured to indicate display progress of a piece of the target media content associated with the each first progress control.

In a third aspect, embodiments of the disclosure further provide an electronic device. The electronic device comprises:

- one or more processors; and
- a memory configured to store one or more programs.

When the one or more programs are executed by the one or more processors, the one or more processors implement the method for displaying media content according to the embodiments of the disclosure.

In a fourth aspect, embodiments of the disclosure further provide a computer-readable storage medium storing a computer program. When the computer program is executed by a processor, the processor implements the method for displaying media content according to the embodiments of the disclosure.

In a fifth aspect, embodiments of the disclosure further provide a computer program product. When the computer program product is executed by a computer, the computer implements the method for displaying media content according to the embodiments of the disclosure.

DETAILED DESCRIPTION OF EMBODIMENTS

At present, the videos in the video collection are displayed unalterably in the related art.

Embodiments of the disclosure will be described below with reference to the accompanying drawings. Although some embodiments of the disclosure are shown in the accompanying drawings, it should be understood that the disclosure may be implemented in various forms, and the embodiments are provided for a more thorough and complete understanding of the disclosure. It should be understood that the drawings and the embodiments of the disclosure are only for illustrative purposes.

It should be understood that all steps described in method embodiments of the disclosure may be executed in a different order and/or in parallel. Further, the method embodiments may comprise additional steps and/or omit execution of the illustrated steps, The terms “comprise” and “comprise” used herein and their variations are open-ended, that is, “including but not limited to” and “comprising but not limited to”. The term “based on” means “at least partly based on”. The term “an embodiment” means “at least one embodiment”. The term “another embodiment” means “at least another embodiment”. The term “some embodiments” means “at least some embodiments”. Related definitions of other terms will be given in the following description.

It should be noted that concepts such as “first” and “second” mentioned in the disclosure are only used to distinguish different apparatuses, modules or units.

It should be noted that modification of “a”, “an” or “a plurality of” mentioned in the disclosure is illustrative, and should be understood by those skilled in the art as “one or more” unless explicitly stated otherwise in the context.

Names of messages or information exchanged between a plurality of apparatuses in the embodiment of the disclosure are only for illustrative purposes.

Figure 1:
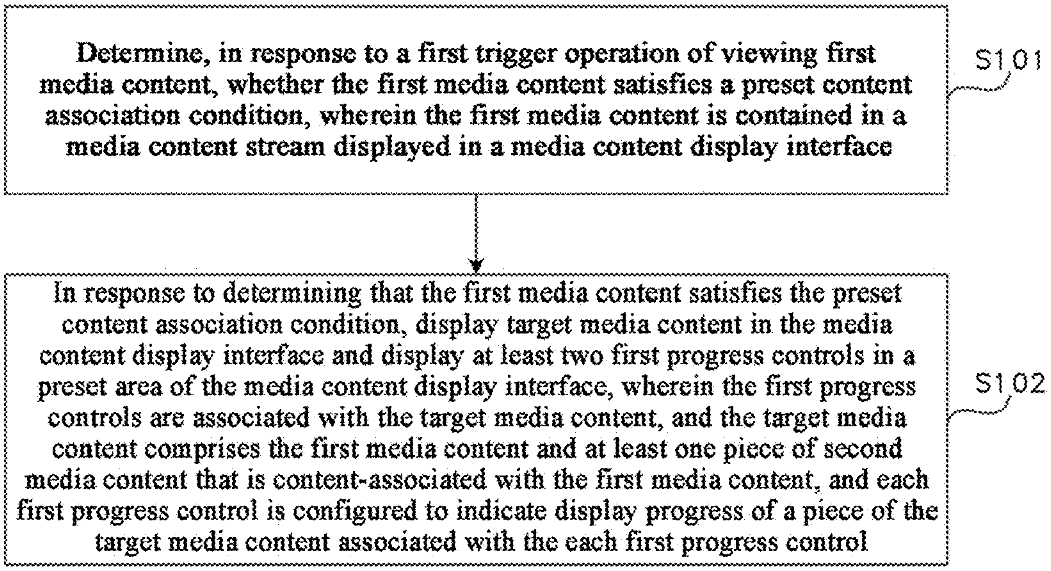
FIG. 1 is a schematic flow diagram of a method for displaying media content according to embodiments of the disclosure.

FIG. 1 is a schematic flow diagram of a method for displaying media content according to embodiments of the disclosure. The method may be executed by an apparatus for displaying media content. The apparatus may be implemented by software and/or hardware, and may be configured in an electronic device. For instance, the apparatus may be configured in a mobile phone or a tablet computer. The method for displaying media content according to the embodiments of the disclosure is applicable to a scene of watching videos having different attributes in the same interface. As shown in FIG. 1, the method for displaying media content according to the embodiments may comprise the following steps:

S101, in response to a first trigger operation of viewing first media content, whether the first media content satisfies a preset content association condition is determined, wherein the first media content is contained in a media content stream displayed in a media content display interface.

Wherein the media content display interface may be an interface configured to display media content in the media content stream. That is, the media content display interface may display the media content in the media content stream based on the corresponding media content stream. The first media content may be any media content, displayed by the media content display interface, in the media content stream. For instance, when the media content display interface is a video playing interface, the media content stream displayed on the interface may be understood as a video stream corresponding to the video playing interface, and the first media content may be any video content in the video stream. The first trigger operation may be an operation of displaying any media content in the media content stream in the media content display interface, such as a media content switching operation based on the media content stream, or an operation of switching from other interfaces to the media content display interface. The preset content association condition may be a content association condition that is set in advance, and may be configured to define a content association of corresponding media content.

Optionally, when a user desires to view the media content in the media content display interface based on the media content stream corresponding to the interface, the first trigger operation may be executed. Accordingly, when an electronic device receives the first trigger operation of the user, the first media content corresponding to the first trigger operation may be determined based on the media content stream currently corresponding to the media content display interface, and whether the first media content satisfies the preset content association condition is determined. If the first media content satisfies the preset content association condition, S102 is executed. If the first media content does not satisfy the preset content association condition, the first media content may be displayed directly in the media content display interface, and no progress control corresponding to the second media content associated with the first media content is displayed in a preset area of the media content display interface.

S102, target media content is displayed in the media content display interface in response to determining that the first media content satisfies the preset content association condition, and at least two first progress controls are displayed in a preset area of the media content display interface, wherein the first progress controls are associated with the target media content, and the target media content comprises the first media content and at least one piece of second media content that is content-associated with the first media content, and each first progress control is configured to indicate display progress of a piece of the target media content associated with the each first progress control.

The target media content comprises the first media content and the second media content. With video content as an instance, the target media content may be a piece of successively played video content aggregated by video content A (that is, the first media content) and related videos associated with the video A (that is, at least one piece of second media content). The second media content may be understood as media content that is content-associated with the first media content, that is, media content associated with the first media content in content, which may be located in the media content stream of the media content display interface or not. In other words, the second media content is determined based on the content association with the first media content, regardless of whether the media content is located in the media content stream of the media content display interface. The first progress control may be understood as a control configured to indicate the display progress of the target media content, which can be displayed in graphics (such as a line segment, etc.) or other forms. The preset area may be a display area where the first progress control is located.

Figure 2:
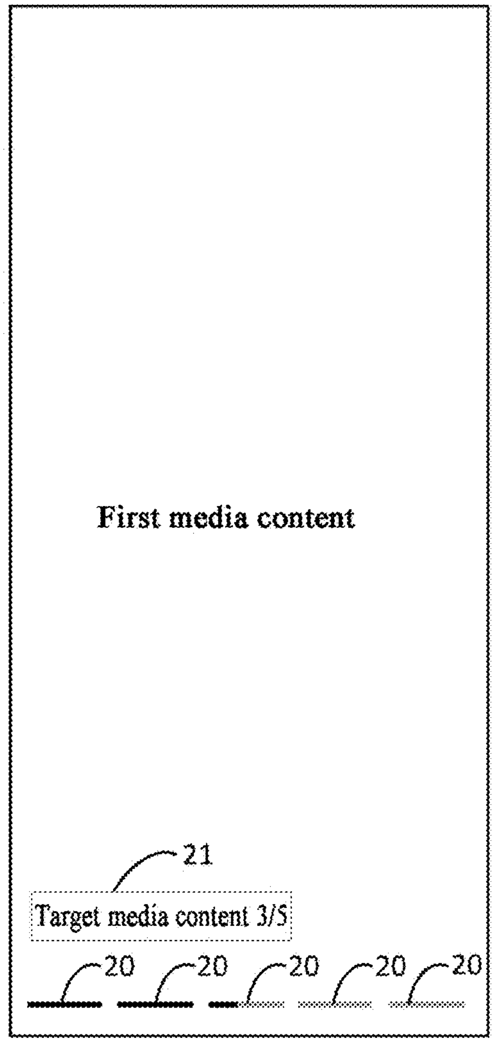
FIG. 2 is a schematic display diagram of a first progress control according to embodiments of the disclosure.

For instance, in response to determining that the first media content to be displayed in the media content stream satisfies the preset content association condition, the target media content may be displayed in the media content display interface. For instance, with a starting point of the target media content as a display starting point, the target media content is displayed in the media content display interface, and the first progress control 20 (the third first progress control 20 as shown in FIG. 2) corresponding to the first media content and the first progress control 20 corresponding to the at least one piece of second media content are displayed in the media content display interface, as shown in FIG. 2. Herein, a display mode of each first progress control 20 maybe set flexibly. For instance, all the first progress controls 20 maybe arranged transversely or longitudinally in the preset area.

In the embodiment, whether the first media content in the media content stream played based on the media content stream satisfies the preset content association condition is determined, and the first progress control of the second media content that is content-associated with the first media content is displayed in the media content display interface when the first media content satisfies the preset condition. The first progress control reminds the user of the fact that the first media content that is currently played has content-associated second media content, and indicates the display progress of the corresponding second media content. A poster of the media content does not need to mark a content association between different pieces of media content, such that an operation required to determine the second media content can be simplified, the display mode of the second media content can be enriched.

In an embodiment, the method for displaying media content according to the embodiments may further comprise the following: that at least one of the first progress controls is switched to a second progress control in response to a second trigger operation acting on the media content display interface, wherein the second progress control is configured to adjust the display progress of the target media content corresponding to the at least one of the first progress controls through sliding.

In the above embodiment, the first progress control may only be configured to switch and display the various pieces of target media content in a sorting order of all the first progress controls in the preset area, and cannot adjust the display progress of the first media content or the second media content. In this case, when the second trigger operation is received, the first progress control may be switched to the second progress control, such that the user may adjust the display progress of the first media content or the second media content with the second progress control, and a progress adjustment demand of the user is satisfied.

Wherein the second trigger operation may be a trigger operation of switching one or more first progress controls displayed in the media content display interface to the second progress control. For instance, the second trigger operation may be a clicking operation or a long-press operation acting on the media content display interface. The second progress control may be configured to adjust the display progress of the first media content or the second media content through sliding.

Figure 3:
FIG. 3 is a schematic display diagram of a second progress control according to embodiments of the disclosure.

Optionally, when the user desires to adjust the display progress of a piece of media content (such as the first media content or the second media content), the user may execute the second trigger operation, for instance, may long press the first progress control displayed in the media content display interface. Accordingly, when the electronic device receives the second trigger operation of the user, one or more first progress controls displayed in the media content display interface are switched to the second progress control 30. For instance, the first progress control of the first media content or the second media content currently displayed in the media content display interface is switched to the second progress control 30, as shown in FIG. 3. Therefore, the user may adjust the display progress of the media content corresponding to the second progress control 30 by dragging a progress adjustment identifier (for instance, a progress slider 31) in the second progress control 30.

It may be understood that the first progress controls corresponding to the plurality of pieces of media content in the target media content may also be merged and switched to the second progress control 30 in other embodiments, such that the display progress of an aggregated part of the plurality of pieces of media content is adjusted.

In the method for displaying media content according to the embodiments, whether the first media content satisfies the preset content association condition is determined in response to the first trigger operation of viewing the first media content, wherein the first media content is contained in the media content stream displayed in the media content display interface; and the target media content is displayed in the media content display interface in response to determining that the first media content satisfies the preset content association condition, and at least two first progress controls are displayed in the preset area of the media content display interface, wherein the first progress controls are associated with the target media content, and the target media content comprises the first media content and the at least one piece of second media content that is content-associated with the first media content, and each first progress control is configured to indicate display progress of a piece of the target media content associated with the each first progress control. With employment of the above method, the embodiments can simplify an operation required to determine other media content content-associated with the media content that is currently displayed, thereby enriching a display mode of the content-associated media content and improving the user experience.

Figure 4:
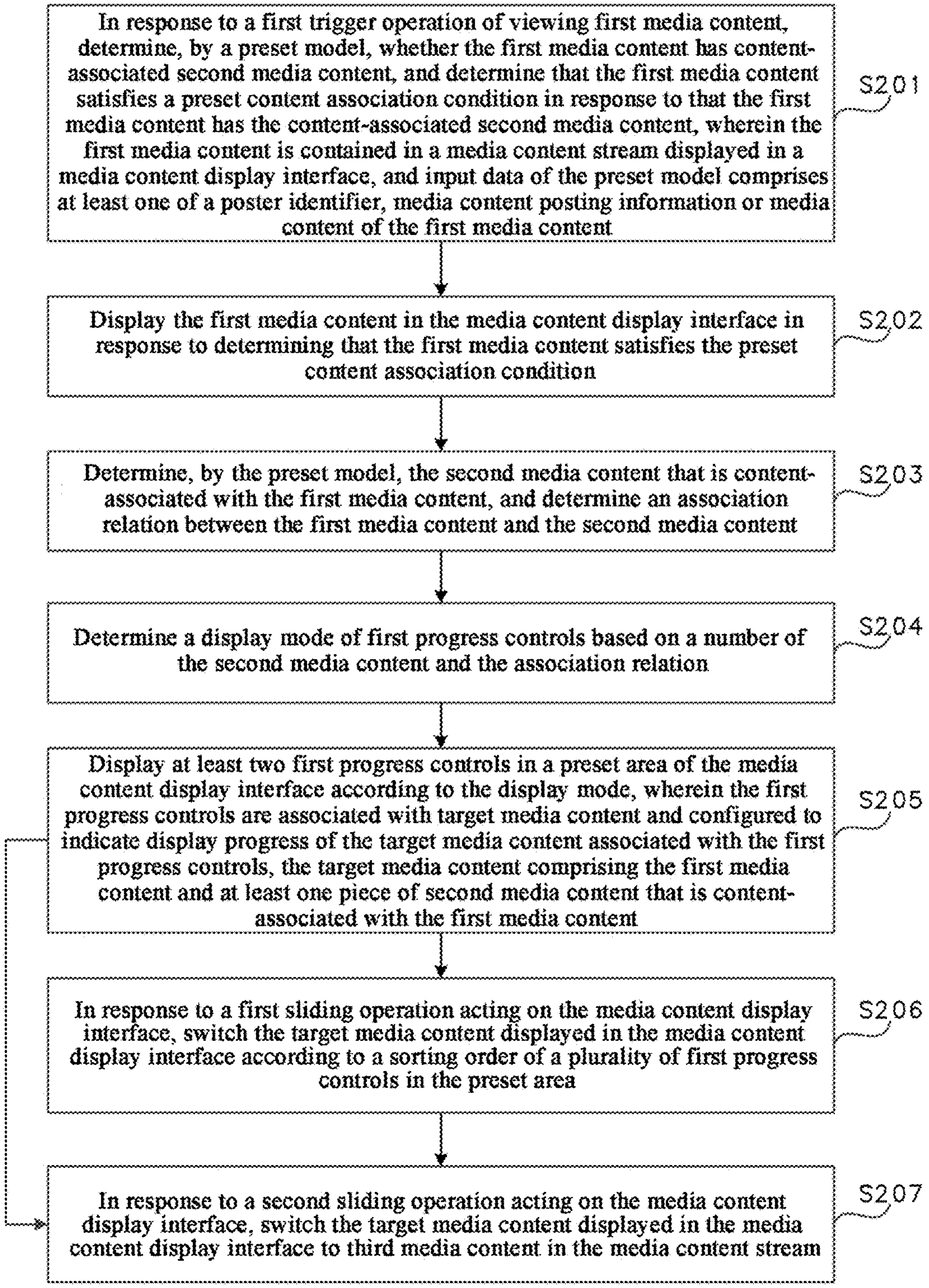
FIG. 4 is a schematic flow diagram of another method for displaying media content according to embodiments of the disclosure.

FIG. 4 is a schematic flow diagram of another method for displaying media content according to embodiments of the disclosure. The solution in the embodiments may be combined with one or more optional solutions in the embodiments. Optionally, determining whether the first media content satisfies the preset content association condition comprises the following: whether the first media content has content-associated second media content is determined by a preset model, and it is determined that the first media content satisfies the preset content association condition in response to determining that the first media content has the content-associated second media content, wherein input data of the preset model comprises at least one of a poster identifier, media content posting information or media content of the first media content.

Optionally, the steps that the target media content is displayed in the media content display interface, and the at least two first progress controls are displayed in the preset area of the media content display interface comprise the following steps: the first media content is displayed in the media content display interface; the second media content that is content-associated with the first media content is determined by the preset model, and an association relation between the first media content and the second media content is determined; a display mode of the first progress controls is determined based on a number of the second media content and the association relation; and the at least two first progress controls are displayed in the preset area of the media content display interface according to the display mode.

Optionally, after the at least two first progress controls are displayed in the preset area of the media content display interface, the method further comprises the following step: the target media content displayed in the media content display interface is switched in a sorting order of a plurality of first progress controls in the preset area in response to a first sliding operation acting on the media content display interface.

Optionally, the method for displaying media content according to the embodiments further comprises the following step: the target media content displayed in the media content display interface is switched to third media content in the media content stream in response to a second sliding operation acting on the media content display interface.

Accordingly, as shown in FIG. 4, the method for displaying media content according to the embodiments may comprise the following steps:

S201, in response to a first trigger operation of viewing first media content, whether the first media content has content-associated second media content is determined by a preset model, and it is determined that the first media content satisfies a preset content association condition in response to determining that the first media content has the content-associated second media content, wherein the first media content is contained in a media content stream displayed in a media content display interface, and input data of the preset model comprises at least one of a poster identifier, media content posting information and media content of the first media content.

In the embodiment, the preset model configured to determine whether the first media content satisfies the preset content association condition may be trained in advance, and when the first trigger operation is received, whether the first media content satisfies the preset content association condition may be determined by the preset model.

The input data of the preset model may comprise the poster identifier of the first media content, the media content posting information of the first media content, and/or media content of the first media content. The media content posting information may be understood as posting information of the first media content, such as whether the first media content is media content in a media content collection and/or a title of the first media content. The media content of the first media content may be understood as content data of the first media content. For instance, when the first media content is video content, the media content of the first media content may be video data of the first media content.

Optionally, when the first trigger operation is received, the poster identifier, the media content posting information and/or the media content of the first media content may be input into the preset model as the input data, and whether the first media content has the content-associated second media content may be determined according to the input data by the preset model. If the first media content has the content-associated second media content, it is determined that the first media content satisfies the preset content association condition. Herein, output of the preset model may comprise a determination result of whether the first media content satisfies the preset content association condition.

S202, the first media content is displayed in the media content display interface in response to determining that the first media content satisfies the preset content association condition.

In the embodiment, when the first media content satisfies the preset content association condition, the first media content may be displayed in the media content display interface. For instance, with a starting point of the first media content as a display starting point, the target media content may be displayed in the media content display interface.

S203, the second media content that is content-associated with the first media content is determined by the preset model, and an association relation between the first media content and the second media content is determined.

In the embodiment, when the preset model determines that the first media content satisfies the preset content association condition, that is, when the first media content has the content-associated second media content, each piece of the second media content that is content-associated with the first media content and the association relation between the first media content and each piece of the second media content may be further determined and output. The association relation may be understood as an association relation between the first media content and each piece of the second media content in content, for instance, a precedence relation between the first media content and each piece of the second media content. For instance, the preset model may determine a plurality of associated videos posted by the same poster, for instance, previous and next episodes, or a plurality of videos of different posters under the same topic as the second media content, and aggregate the second media content with the first media content, such that the target media content is obtained.

S204, a display mode of first progress controls is determined based on a number of the second media content and the association relation.

In the embodiment, a media content identifier of the second media content output from the preset model and the association relation between the first media content and the second media content may be obtained, and the display mode of the first progress control may be determined according to the number of the second media content and the association relation. For instance, a number of the first progress controls to be displayed in a preset area and display progress of the target media content are determined according to a preset display rule. In this case, Optionally, the display mode of the first progress controls comprises a display number of the first progress controls and the display progress of the current target media content.

Optionally, the display progress of the target media content comprises at least one of: sorting information of the first progress control corresponding to the first media content in the at least two first progress controls; and the display progress indicated by the first progress control corresponding to the target media content, that is, the sorting information of the first progress control corresponding to each piece of media content to be displayed in the preset area during display, and the display progress of the target media content indicates when each first progress control is displayed in the preset area.

In an embodiment, the step that the display mode of the first progress controls is determined based on the number of the second media content and the association relation comprises the following steps: the display number of the first progress controls is determined based on the number of the second media content and a preset number threshold, the target media content is sorted based on the association relation, and a sorting result is generated; the first progress controls corresponding to a plurality of pieces of successive target media content corresponding to the display number are obtained according to the sorting result, wherein the plurality of pieces of successive target media content comprise the first media content; and the display progress of the current target media content is determined according to the obtained first progress control.

The preset number threshold may be understood as a number threshold of the first progress controls that may be displayed in the preset area, which may be set by a developer as required.

For instance, in response to determining the display progress of the target media content, the display number of the first progress controls may be determined according to the number of the second media content and the preset number threshold. For instance, when the number of the second media content is smaller than the preset number threshold, the display number of the first progress controls may be determined as the number of the first media content. When the number of the first media content is greater than or equal to the preset number threshold, the number of the first progress controls may be determined as the preset number threshold. In addition, the first media content and each piece of the second media content are sorted according to the determined association relation, such that the sorting result is generated.

Then, the first progress controls corresponding to the plurality of pieces of successive media content corresponding to the determined display number are obtained according to the sorting result. For instance, an optional display position of the first progress control corresponding to the first media content may be set in advance. Assuming that the first media content is nth (n is a positive integer) target media content in the sorting result, the number threshold is 5, and a third of the first progress controls is preferentially displayed as a progress control corresponding to the first media content (as shown in FIG. 2), the first progress control corresponding to each piece of media content in the sorting result may be obtained when the display number determined is smaller than or equal to 5; and whether at least two pieces of second media content exist before and after the first media content in the sorting result may be determined when the determined display number is greater than 5. If the at least two pieces of second media content exist both before and after the first media content, the first progress controls corresponding to (n−2)th media content to (n+2)th media content in the sorting result are obtained. If the at least two pieces of second media content do not exist before the first media content, the first progress controls corresponding to the first 5 pieces of media content in the sorting result are obtained. If the at least two pieces of second media content do not exist after the first media content, the first progress controls corresponding to the last 5 pieces of media content in the sorting result are obtained.

Therefore, after the first progress control corresponding to each piece of media content to be displayed is obtained, the first progress controls may be sorted in an order of each piece of media content in the sorting result, and the display progress indicated by the first progress control before the first progress control corresponding to the first media content is set as displayed completely. The display progress indicated by the first progress control corresponding to the first media content and the first progress control after the first progress control after the first media content is set as not yet displayed.

S205, the at least two first progress controls are displayed in the preset area of the media content display interface according to the display mode, and S206 or S207 is executed, wherein the first progress controls are associated with the target media content, and the target media content comprises the first media content and at least one piece of second media content that is content-associated with the first media content, and each first progress control is configured to indicate display progress of a piece of the target media content associated with the each first progress control.

Optionally, after the display mode corresponding to each first progress control to be displayed is determined, the plurality of first progress controls may be displayed in the preset area of the media content display interface according to the display mode.

S206, the target media content displayed in the media content display interface is switched in a sorting order of the plurality of first progress controls in the preset area in response to a first sliding operation acting on the media content display interface.

Wherein the first sliding operation may be understood as an operation of instructing the electronic device to switch the media content displayed in the media content display interface in a sorting order of the plurality of first progress controls in the preset area, and it may be a sliding operation in any direction. The description will be provided below with the first sliding operation as a transverse sliding operation as an instance.

For instance, when the user desires to switch the media content (for instance, the first media content or the second media content) displayed in the media content display interface, the user may execute the first sliding operation, for instance, may slide leftward or rightward in the media content display interface. Accordingly, when the electronic device receives the first sliding operation of the user, the media content that is currently displayed in the media content display interface may be switched to another piece of media content. If the plurality of first progress controls are arranged transversely in the preset area, when the user slides leftward in the media content display interface, the media content currently displayed in the media content display interface may be switched to the media content corresponding to the first progress control that is adjacent to the first progress control of the media content and located on a left/right side of the first progress control of the media content. When the user slides rightward in the media content display interface, the media content currently displayed in the media content display interface may be switched to the media content corresponding to the first progress control that is adjacent to the first progress control of the media content and located on a right/left side of the first progress control of the media content.

In the embodiment, the user may view the second media content that is content-associated with the first media content in the media content stream on a current interface (that is, the media content display interface) through a simple sliding operation, and interface switching is not needed, such that an operation required to view the content-associated media content can be simplified, and user experience can be improved.

In an embodiment, after the target media content displayed in the media content display interface is switched, the method further comprises the following step: an associated media content control is displayed in the media content display interface in response to that the first progress control corresponding to the target media content after switching is displayed at a set position of the preset area, wherein the associated media content control is configured to trigger displaying a media content list of the second media content.

In the above embodiment, when the first progress control corresponding to the switched target media content is displayed at the set position of the preset area, the associated media content control may be displayed in the media content display interface, such that the user may view other second media content whose first progress control is not displayed in the media content display interface conveniently by triggering the associated media content control.

Wherein the first progress control corresponding to the target media content after switching may be understood as the first progress control corresponding to the first media content/second media content displayed in the media content display interface after switching. The set position may be set as any position in the preset area as required, for instance, it may be a display position of a first of the first progress controls 20 and/or a last of the first progress controls 20 in the preset area, which will be regarded as an instance for description below.

Figure 5:
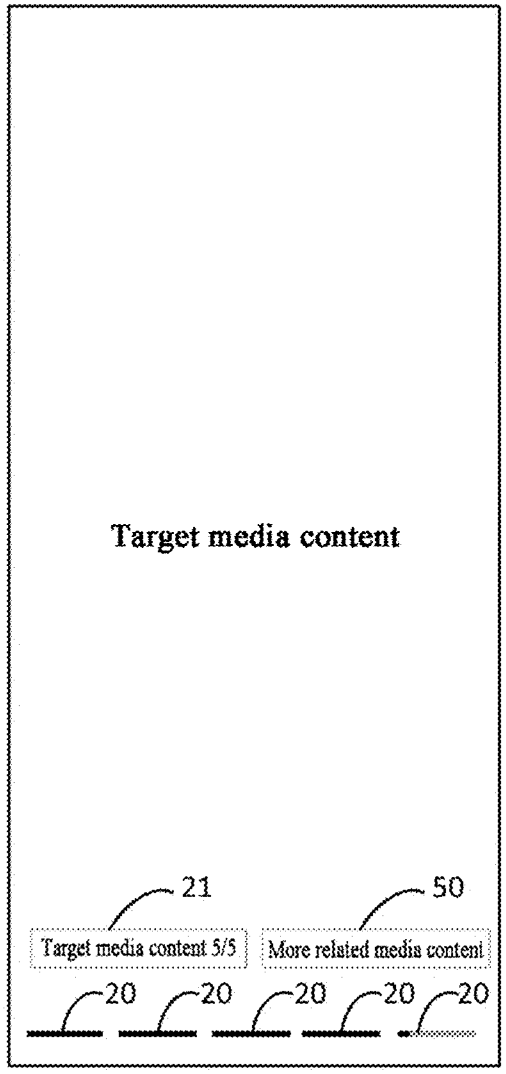
FIG. 5 is a schematic display diagram of an associated media content control according to embodiments of the disclosure.

For instance, after the target media content displayed in the media content display interface is switched in response to the first sliding operation of the user, it is decided that whether the first progress control 20 corresponding to the target media content after switching is the first of the first progress controls 20 displayed in the preset area or the last first progress control 20 displayed in the preset area. If the first progress control 20 corresponding to the target media content after switching is the first of the first progress controls 20 displayed in the preset area or the last first progress control 20 displayed in the preset area, the associated media content control 50 may be displayed in the media content display interface, as shown in FIG. 5. Therefore, the user may instruct the electronic device to display the associated media content list in the currently displayed media content display interface or other interfaces by triggering the associated media content control 50, so as to view each piece of second media content associated with the first media content in the associated media content list.

In addition, if the first progress control corresponding to the first media content is the first of the first progress controls displayed in the preset area, the associated media content control may be displayed in the media content display interface or not when the first media content is displayed in the media content display interface in response to the first trigger operation. If the first progress control corresponding to the first media content is the last of the first progress controls displayed in the preset area, the associated media content control may be displayed in the media content display interface when the first media content is displayed in the media content display interface in response to the first trigger operation. As the target media content is played, when the currently played target media content is switched to the media content corresponding to the last of the first progress controls displayed in the preset area (which is not switched based on the trigger operation of the user), the associated media content control may also be displayed in the media content display interface automatically.

In another embodiment, when not all of the first progress controls corresponding to the second media content can be displayed in the preset area, that is, when there exists the target media content whose corresponding first progress control is not displayed in the preset area, the associated media content control may be displayed in the media content display interface, such that convenience for the user to view different target media content is improved. In this case, the method for displaying media content according to the embodiments may further comprise the following step: the associated media content control is displayed in the media content display interface in response to that the number of the second media content is greater than the display number, wherein the associated media content control is configured to trigger displaying a media content list of the second media content.

In another embodiment, after the target media content displayed in the media content display interface is switched, the method further comprises the following step: the first progress control displayed in the preset area is updated in response to that the first progress control corresponding to the target media content after switching satisfies a preset updating condition.

In the above embodiment, in response to that the first progress control corresponding to the target media content after switching satisfies the preset updating condition, the first progress control displayed in the preset area may be updated, such that the user may view the second media content corresponding to the first progress control that is not initially displayed in the preset area conveniently.

For instance, after the target media content displayed in the media content display interface is switched, it is decided that whether the target media content after switching satisfies the preset updating condition. For instance, it is decided that whether the first progress control corresponding to the target media content after switching is displayed at a first set position in the preset area, and/or it is decided that whether the first progress control corresponding to the target media content after switching is not displayed in the preset area. If the target media content after switching satisfies the preset updating condition, the first progress control displayed in the preset area is updated. For instance, the plurality of first progress controls displayed in the preset area are updated in batches, and alternatively, the plurality of first progress controls displayed in the preset area are controlled to move in a preset direction, such that the first progress control that is not displayed is moved into the preset area for display.

It may be understood that when a piece of target media content is displayed in the media content display interface, an aggregation tag 21 of the target media content may also be displayed, as shown in FIGS. 2 and 5. The aggregation tag indicates that the currently displayed media content is media content corresponding to which of the plurality of first progress controls 20 displayed in the preset area.

S207, the target media content displayed in the media content display interface is switched to third media content in the media content stream in response to a second sliding operation acting on the media content display interface.

Wherein the second sliding operation may be understood as an operation of instructing the electronic device to switch the media content displayed in the media content display interface according to the media content stream corresponding to the media content display interface, which may be a sliding operation different from the first sliding operation. For instance, when the first sliding operation is a transverse sliding operation, the second sliding operation may be a vertical sliding operation. The third media content may be the media content in the media content stream that is different from the first media content. For instance, the third media content may be the media content adjacent to the first media content in the media content stream.

Optionally, when the user desires to switch the media content displayed in the media content display interface based on the media content stream, the user may execute the second sliding operation, for instance, may slide upward or downward in the media content display interface. Accordingly, when the electronic device receives the second sliding operation of the user, the first media content or the second media content that is currently displayed in the media content display interface may be switched to the third media content in the media content stream. For instance, when the user slides upward in the media content display interface, the first media content or the second media content currently displayed in the media content display interface is switched to the media content that is adjacent to the first media content and located after/before the first media content in the media content stream. When the user slides downward in the media content display interface, the first media content or the second media content currently displayed in the media content display interface is switched to the media content that is adjacent to the first media content and located before/after the first media content in the media content stream.

In the embodiment, regardless of whether the first media content or the second media content is displayed in the current media content display interface, the user may view the media content other than the first media content in the media content stream through a simple sliding operation. For instance, if the media content currently displayed is the first media content in the media content stream, the user may switch the currently displayed media content in the media content stream based on the media content stream through the sliding operation. If the media content currently displayed is not the first media content in the media content stream, the user may return to the media content stream and switch the media content based on the media content stream through the simple sliding operation, without switching interfaces or an operation of firstly switching from the media content displayed in the media content display interface back to the first media content in the media content stream and then switching the current media content based on the media content stream. As such, an operation required by the user is simplified and the user experience is improved.

In the method for displaying media content according to the embodiment, the second media content that is content-associated with the first media content currently displayed in the media content display interface may be determined by the preset model, the first progress control of the second media content is displayed, and the second media content is displayed in the media content display interface based on the corresponding sliding operation of the user, without an operation that a poster of the media content marks an association between the media content or switching interfaces. An operation required to determine and display the content-associated media content can be simplified, and the user experience can be improved.

Figure 6:
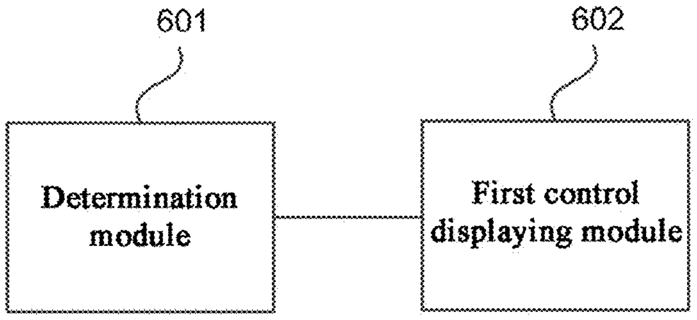
FIG. 6 is a structural block diagram of an apparatus for displaying media content according to embodiments of the disclosure.

FIG. 6 is a structural block diagram of an apparatus for displaying media content according to embodiments of the disclosure. The apparatus may be implemented by software and/or hardware, and may be configured in an electronic device. For instance, the apparatus may be configured in a mobile phone or a tablet computer, and may display a progress control of content-associated media content by executing the method for displaying media content. As shown in FIG. 6, the apparatus for displaying media content according to the embodiment may comprise: a determination module 601 and a first control displaying module 602.

The determination module 601 is configured to determine, in response to a first trigger operation of viewing first media content, whether the first media content satisfies a preset content association condition. The first media content is contained in a media content stream displayed in a media content display interface.

The first control displaying module 602 is configured to display target media content in the media content display interface in response to determining that the first media content satisfies the preset content association condition, and to display at least two first progress controls in a preset area of the media content display interface. The first progress controls are associated with the target media content and each first progress control is configured to indicate display progress of a piece of the target media content associated with the each first progress control. The target media content comprises the first media content and at least one piece of second media content that is content-associated with the first media content.

In the apparatus for displaying media content according to the embodiment, the determination module determines whether the first media content satisfies the preset content association condition in response to the first trigger operation of viewing the first media content, wherein the first media content is contained in the media content stream displayed in the media content display interface; and the first control displaying module displays the target media content in the media content display interface in response to determining that the first media content satisfies the preset content association condition, and displays at least two first progress controls in the preset area of the media content display interface, wherein the first progress controls are associated with the target media content and each first progress control is configured to indicate display progress of a piece of the target media content associated with the each first progress control, and the target media content comprises the first media content and the at least one piece of second media content that is content-associated with the first media content. With employment of the above apparatus, the embodiment can simplify an operation required to determine other media content that is content-associated with the currently displayed media content, enrich a display mode of the content-associated media content, and improve the user experience.

In the solution, the determination module 601 is configured to determine whether the first media content satisfies the preset content association condition through the following method:

Whether the first media content has the content-associated second media content is determined by a preset model, and it is determined that the first media content satisfies the preset content association condition in response to that the first media content has the content-associated second media content. Input data of the preset model comprises at least one of a poster identifier, media content posting information or media content of the first media content.

In the solution, the first control displaying module 602 may comprise:

- a media content displaying unit configured to display the first media content in the media content display interface;
- a media content determination unit configured to determine the second media content that is content-associated with the first media content by the preset model, and determine an association relation between the first media content and the second media content;
- a display mode determination unit configured to determine a display mode of the first progress controls based on a number of the second media content and the association relation; and
- a control displaying unit configured to display the at least two first progress controls in the preset area of the media content display interface according to the display mode.

In the solution, the display mode of the first progress controls may comprise a display number of the first progress controls and the display progress of the current target media content.

In the solution, the display progress of the target media content may comprise at least one of: sorting information of the first progress control corresponding to the first media content in the at least two first progress controls; or the display progress indicated by the first progress control corresponding to the target media content.

In the solution, the display mode determination unit may comprise:

- a sorting sub-unit configured to determine a display number of the first progress controls based on the number of the second media content and a preset number threshold, sort a plurality of pieces of target media content based on the association relation, and generate a sorting result;
- a control obtaining sub-unit configured to obtain the first progress controls corresponding to a plurality of pieces of successive target media content corresponding to the display number according to the sorting result, wherein the plurality of pieces of successive target media content comprise the first media content; and a progress determination sub-unit configured to determine the display progress of the current target media content according to the obtained first progress control.

Optionally, the apparatus for displaying media content according to the embodiment may further comprise:

a second control displaying module configured to display an associated media content control in the media content display interface in response to that the number of the second media content is greater than the display number, wherein the associated media content control is configured to trigger displaying a media content list of the second media content.

Optionally, the apparatus for displaying media content according to the embodiment may further comprise:

a first switching module configured to switch, after the at least two first progress controls are displayed in the preset area of the media content display interface, the target media content displayed in the media content display interface according to a sorting order of a plurality of first progress controls in the preset area in response to a first sliding operation acting on the media content display interface.

Optionally, the apparatus for displaying media content according to the embodiment may further comprise:

a third control displaying module configured to display, after the target media content displayed in the media content display interface is switched, an associated media content control in the media content display interface in response to that the first progress control corresponding to the target media content after switching is displayed at a set position of the preset area, wherein the associated media content control is configured to trigger displaying a media content list of the second media content.

Optionally, the apparatus for displaying media content according to the embodiment may further comprise:

a second switching module configured to switch at least one of the first progress controls to a second progress control in response to a second trigger operation acting on the media content display interface, wherein the second progress control is configured to adjust the display progress of the target media content corresponding to the at least one of the first progress controls through sliding.

Optionally, the apparatus for displaying media content according to the embodiment may further comprise:

a third switching module configured to switch the target media content displayed in the media content display interface to third media content in the media content stream in response to a second sliding operation acting on the media content display interface.

The apparatus for displaying media content according to the embodiment of the disclosure may execute the method for displaying media content according to any one of the embodiments of the disclosure, and has corresponding functional modules and beneficial effects corresponding to execution of the method for displaying media content. Reference may be made to the method for displaying media content according to any one of the embodiments of the disclosure for technical details not described in detail in the embodiment.

Figure 7:
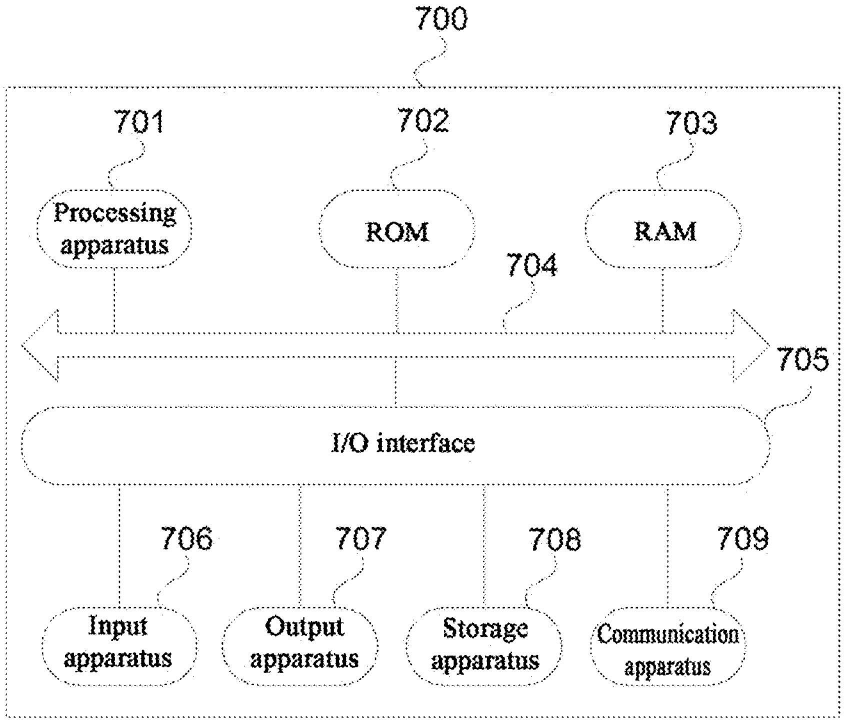
FIG. 7 is a schematic structural diagram of an electronic device according to embodiments of the disclosure.

FIG. 7 shows a schematic structural diagram of an electronic device (for instance, a terminal device) 700 suitable for implementing embodiments of the disclosure below. The terminal device in the embodiments of the disclosure may be a mobile terminal such as a mobile phone, a notebook computer, a digital broadcast receiver, a personal digital assistant (PDA), a portable android device (PAD), a portable media player (PMP), or a vehicle-mounted terminal (for instance, a vehicle-mounted navigation terminal), and a fixed terminal such as a digital television (TV) or a desktop computer. The electronic device shown in FIG. 7 is only illustrative.

As shown in FIG. 7, the electronic device 700 may comprise a processing apparatus (for instance, a central processing unit or a graphics processing unit) 701, which may execute various appropriate actions and processing according to a program stored in a read only memory (ROM) 702 or a program loaded from a storage apparatus 708 to a random access memory (RAM) 703. The RAM 703 further stores various programs and data required for operations of the electronic device 700. The processing apparatus 701, the ROM 702 and the RAM 703 are connected to one another by means of a bus 704. An input/output (I/O) interface 705 is further connected to the bus 704.

Generally, the following apparatuses may be connected to the I/O interface 705: an input apparatus 706 including, for instance, a touch screen, a touch pad, a keyboard, a mouse, a camera, a microphone, an accelerometer, a gyroscope, etc.; an output apparatus 707 including, for instance, a liquid crystal display (LCD), a speaker, a vibrator, etc.; the storage apparatus 708 including, for instance, a magnetic tape, a hard disk, etc.; and a communication apparatus 709. The communication apparatus 709 may allow the electronic device 700 to be in wireless or wired communication with other devices so as to achieve data exchange. Although FIG. 7 shows the electronic device 700 including various apparatuses, it should be understood that not all the apparatuses shown are required to be implemented or comprised. More or fewer apparatuses may be Optionally implemented or comprised.

Particularly, according to the embodiments of the disclosure, the process described above with reference to the flow diagram may be implemented to be a computer software program. For instance, embodiments of the disclosure comprise a computer program product. The computer program product comprises a computer program born by a non-transitory computer-readable medium. The computer program comprises a program code configured to execute the method shown in the flow diagram. In such embodiments, the computer program may be downloaded and configured from a network through the communication apparatus 709, or configured from the storage apparatus 708, or configured from the ROM 702. The computer program executes the functions in the method according to the embodiments of the disclosure when being executed by the processing apparatus 701.

It should be noted that the computer-readable medium described in the disclosure may be a computer-readable signal medium, or a computer-readable storage medium, or any combination thereof. For instance, the computer-readable storage medium may be an electronic, magnetic, optical, electromagnetic, infrared, or semiconductor system, apparatus, or device, or any suitable combination thereof. The computer-readable storage medium may be, but is not limited to, an electrical connection with one or more wires, a portable computer disk, a hard disk, RAM, ROM, an erasable programmable read-only memory (EPROM), a flash memory, an optical fiber, a compact disc read-only memory (CD-ROM), an optical storage device, a magnetic storage device, or any suitable combination thereof. In the disclosure, the computer-readable storage medium may be any tangible medium including or storing a program. The program may be used by or in combination with an instruction execution system, apparatus or device. In the disclosure, the computer-readable signal medium may comprise a data signal in a baseband or as part of a carrier for transmission, and the data signal carries a computer-readable program code. The transmitted data signal may be in various forms, which may be an electromagnetic signal, an optical signal, or any suitable combination thereof. The computer-readable signal medium may further be any computer-readable medium other than the computer-readable storage medium. The computer-readable signal medium may transmit, propagate or transmit a program used by or in combination with an instruction execution system, apparatus or device. The program code comprised in the computer-readable medium may be transmitted by any suitable medium including an electric wire, an optical cable, radio frequency (RF), etc., or any suitable combination thereof.

In some embodiments, a client and a server may be in communication with each other with any currently known or future-developed network protocol, for instance, a hypertext transfer protocol (HTTP), and may be interconnected with digital data communication (for instance, a communication network) in any form or medium. Instances of the communication network comprise a local area network (LAN), a wide area network (WAN), the internet work (for instance, the Internet), an end-to-end network (for instance, an ad hoc end-to-end network), and any currently known or future-developed networks.

The computer-readable medium may be comprised in the electronic device, or may exist independently without being assembled into the electronic device.

The computer-readable medium carries one or more programs. When the one or more programs are executed by the electronic device, the electronic device may execute the following steps: in response to a first trigger operation of viewing first media content, whether the first media content satisfies a preset content association condition is determined, wherein the first media content is contained in a media content stream displayed in a media content display interface; and target media content is displayed in the media content display interface in response to determining that the first media content satisfies the preset content association condition, and at least two first progress controls are displayed in a preset area of the media content display interface, wherein the first progress controls are associated with the target media content and each first progress control is configured to indicate display progress of a piece of the target media content associated with the each first progress control, and the target media content comprises the first media content and at least one piece of second media content that is content-associated with the first media content.

A computer program code configured to execute an operation of the disclosure may be written in one or more programming languages or a combination thereof. The programming languages comprise object-oriented programming languages such as Java, Smalltalk, and C++, and further comprise conventional procedural programming languages such as "C" or similar programming languages. The program code may be executed entirely on a user computer, executed partially on a user computer, executed as a standalone software package, executed partially on a user computer and partially on a remote computer, or executed entirely on the remote computer or a server. In the case involving the remote computer, the remote computer may be connected to the user computer through any type of networks including the LAN or the WAN, or may be connected to an external computer (for instance, the remote computer is connected through the Internet by an Internet service provider).

The flow diagrams and block diagrams in the accompanying drawings illustrate system structures, functions and operations, which may be achieved according to systems, methods and computer program products in all the embodiments of the disclosure. In view of this, each block in the flow diagrams or block diagrams may represent a module, a program segment, or part of a code, which comprises one or more executable instructions configured to implement specified logic functions. It should further be noted that in some alternative implementations, the functions noted in the blocks may also occur in an order different from that in the accompanying drawings. For instance, the functions represented by two successive blocks may be actually implemented basically in parallel, or may be implemented in reverse orders, which depends on the involved functions. It should further be noted that each block in the block diagrams and/or flow diagrams and combinations of the blocks in the block diagrams and/or the flow diagrams may be implemented with dedicated hardware-based systems that implement the specified functions or operations, or may be implemented with combinations of dedicated hardware and computer instructions.

The units involved in the embodiments described in the disclosure may be implemented by software or hardware. Names of the modules do not limit the units themselves in some cases.

The functions described herein may be at least partially executed by one or more hardware logic components. For instance, illustrative types of hardware logic components that may be used comprise: a field programmable gate array (FPGA), an application specific integrated circuit (ASIC), application specific standard parts (ASSPs), a system on chip (SOC), a complex programmable logic device (CPLD), etc.

In the context of the disclosure, the machine-readable medium may be a tangible medium, which may comprise or store a program used by or used in combination with an instruction execution system, apparatus or device. The machine-readable medium may be a machine-readable signal medium or a machine-readable storage medium. The machine-readable medium may comprise an electronic, magnetic, optical, electromagnetic, infrared, or semiconductor system, apparatus, or device, or any suitable combination thereof. The machine-readable storage medium may comprise an electrical connection based on one or more wires, a portable computer disk, a hard disk, RAM, ROM, an erasable programmable read-only memory (EPROM or a flash memory), an optical fiber, CD-ROM, an optical storage device, a magnetic storage device, or any suitable combination thereof.

According to one or more embodiments of the disclosure, instance 1 provides a method for displaying media content. The method comprises the following steps:

in response to a first trigger operation of viewing first media content, whether the first media content satisfies a preset content association condition is determined, wherein the first media content is contained in a media content stream displayed in a media content display interface; and target media content is displayed in the media content display interface in response to determining that the first media content satisfies the preset content association condition, and at least two first progress controls are displayed in a preset area of the media content display interface, wherein the first progress controls are associated with the target media content and each first progress control is configured to indicate display progress of a piece of the target media content associated with the each first progress control, and the target media content comprises the first media content and at least one piece of second media content that is content-associated with the first media content.

According to one or more embodiments of the disclosure, the step that whether the first media content satisfies the preset content association condition is determined in instance 2 according to the method of the instance 1 comprises the following steps:

whether the first media content has the content-associated second media content is determined by a preset model, and it is determined that the first media content satisfies the preset content association condition in response to determining that the first media content has the content-associated second media content, wherein input data of the preset model comprises at least one of a poster identifier, media content posting information and media content of the first media content.

According to one or more embodiments of the disclosure, the steps that the target media content is displayed in the media content display interface, and the at least two first progress controls are displayed in the preset area of the media content display interface in instance 3 according to the method of the instance 2 comprise the following steps:

the first media content is displayed in the media content display interface;

the second media content that is content-associated with the first media content is determined by the preset model, and an association relation between the first media content and the second media content is determined;

a display mode of the first progress controls is determined based on a number of the second media content and the association relation; and the at least two first progress controls are displayed in the preset area of the media content display interface according to the display mode.

According to one or more embodiments of the disclosure, in instance 4 according to the method of the instance 3, the display mode of the first progress controls comprises a display number of the first progress controls and the display progress of the current target media content.

According to one or more embodiments of the disclosure, in instance 5 according to the method of the instance 4, the display progress of the target media content comprises at least one of:

sorting information of the first progress control corresponding to the first media content in the at least two first progress controls; and the display progress indicated by the first progress control corresponding to the target media content.

According to one or more embodiments of the disclosure, the step that the display mode of the first progress controls is determined based on the number of the second media content and the association relation in instance 6 according to the method of the instance 3 comprises:

a display number of the first progress controls is determined based on the number of the second media content and a preset number threshold, a plurality of pieces of target media content are sorted based on the association relation, and a sorting result is generated;

the first progress controls corresponding to a plurality of pieces of successive target media content corresponding to the display number are obtained according to the sorting result, wherein the plurality of pieces of successive target media content comprise the first media content; and the display progress of the current target media content is determined according to the first progress control obtained.

According to one or more embodiments of the disclosure, instance 7 according to the method of the instance 6 further comprises the following step:

an associated media content control is displayed in the media content display interface in response to determining that the number of the second media content is greater than the display number, wherein the associated media content control is configured to trigger displaying a media content list of the second media content.

According to one or more embodiments of the disclosure, in instance 8 according to the method of the instance 1, after the at least two first progress controls are displayed in the preset area of the media content display interface, the method further comprises the following step:

the target media content displayed in the media content display interface is switched in a sorting order of a plurality of first progress controls in the preset area in response to a first sliding operation acting on the media content display interface.

According to one or more embodiments of the disclosure, in instance 9 according to the method of the instance 8, after the target media content displayed in the media content display interface is switched, the method further comprises the following step:

an associated media content control is displayed in the media content display interface in response to determining that the first progress control corresponding to the target media content after switching is displayed at a set position of the preset area, wherein the associated media content control is configured to trigger displaying a media content list of the second media content.

According to one or more embodiments of the disclosure, instance 10 according to the method of any one of the instances 1 to 9 further comprises the following step:

at least one of the first progress controls is switched to a second progress control in response to a second trigger operation acting on the media content display interface, wherein the second progress control is configured to adjust the display progress of the target media content corresponding to the at least one of the first progress controls through sliding.

According to one or more embodiments of the disclosure, instance 11 according to the method of any one of the instances 1 to 9 further comprises the following step:

the target media content displayed in the media content display interface is switched to third media content in the media content stream in response to a second sliding operation acting on the media content display interface.

According to one or more embodiments of the disclosure, instance 12 provides an apparatus for displaying media content. The apparatus comprises:

a determination module configured to determine, in response to a first trigger operation of viewing first media content, whether the first media content satisfies a preset content association condition, wherein the first media content is contained in a media content stream displayed in a media content display interface; and a first control displaying module configured to display target media content in the media content display interface in response to determining that the first media content satisfies the preset content association condition, and to display at least two first progress controls in a preset area of the media content display interface, wherein the first progress controls are associated with the target media content and each first progress control is configured to indicate display progress of a piece of the target media content associated with the each first progress control, and the target media content comprises the first media content and at least one piece of second media content that is content-associated with the first media content.

According to one or more embodiments of the disclosure, instance 13 provides an electronic device. The electronic device comprises:

one or more processors; and a memory configured to store one or more programs.

When the one or more programs are executed by the one or more processors, the one or more processors implement the method for displaying media content according to any one of the instances 1 to 11.

According to one or more embodiments of the disclosure, instance 14 provides a computer-readable storage medium storing a computer program. When the computer program is executed by a processor, the processor implements the method for displaying media content according to any one of the instances 1 to 11.

According to one or more embodiments of the disclosure, instance 15 provides a computer program product. When the computer program product is executed by a computer, the computer implements the method for displaying media content according to any one of the instances 1 to 11.

Further, although operations are depicted in a particular order, it should be understood that the operations are not required to be executed in the particular order shown or in a sequential order. In some cases, multitasking and parallel processing may be advantageous. Some features described in the context of separate embodiments may also be implemented in combination in a single embodiment. On the contrary, various features described in the context of a single embodiment may also be implemented in a plurality of embodiments independently or in any suitable sub-combination manner.

The invention claimed is:

1. A method for displaying media content, comprising:

determining, in response to a first trigger operation of viewing first media content, whether the first media content satisfies a preset content association condition, wherein the first media content is contained in a media content stream displayed in a media content display interface;

in response to determining that the first media content satisfies the preset content association condition, displaying the first media content in media content in the media content display interface and displaying a plurality of first progress controls in a preset area of the media content display interface, wherein the media content comprises at least one piece of second media content that is content-associated with the first media content, and the plurality of first progress controls are associated with the first media content and the at least one piece of second media content and configured to indicate display progress of the first media content and the at least one piece of second media content;

in response to a first sliding operation acting on a display area of the first media content in a media content display page, switching display of the first media content in the media content display page to display of one of the at least one piece of second media content according to a sorting order of the plurality of first progress controls in the preset area, the display area being different from the preset area of the media content display page;

in response to switching display of the first media content in the media content display page to display of the at least one piece of second media content, determining that the first progress control corresponding to the at least one piece of second media content is not displayed in a first position in the preset area; and moving the plurality of first progress controls displayed in the preset area in a preset direction such that the first progress control corresponding to the at least one piece of second media content is displayed in the first position, and at least one first progress control that is not displayed being added into the preset area.

2. The method according to claim 1, further comprising: after the switching the display of the first media content in the media content display interface, in response to a first progress control corresponding to the first media content after switching being displayed at a set position of the preset area, displaying an associated media content control in the media content display interface, wherein the associated media content control is configured to trigger displaying a media content list of the second media content.

3. The method according to claim 1, further comprising:

in response to a second sliding operation acting on the media content display interface, switching the media content displayed in the media content display interface to third media content in the media content stream.

4. The method according to claim 1, wherein the determining whether the first media content satisfies the preset content association condition comprises:

determining, by a preset model, whether the first media content has the content-associated second media content, and determining that the first media content satisfies the preset content association condition in response to that the first media content has the content-associated second media content, wherein input data of the preset model comprises at least one of a poster identifier, media content posting information or media content of the first media content.

5. The method according to claim 4, wherein the displaying the first media content in the media content in the media content display interface, and displaying at least two first progress controls in the preset area of the media content display interface comprise:

determining, by the preset model, second media content that is content-associated with the first media content, and determining an association relation between the first media content and the second media content;

determining a display mode of the first progress controls based on a number of the second media content and the association relation; and displaying the at least two first progress controls in the preset area of the media content display interface according to the display mode.

6. The method according to claim 5, wherein the display mode of the first progress controls comprises a display number of the first progress controls and display progress of a current media content.

7. The method according to claim 6, wherein the display progress of the media content comprises at least one of:

sorting information of a first progress control corresponding to the first media content in the at least two first progress controls; or the display progress indicated by a first progress control corresponding to the media content.

8. The method according to claim 5, wherein the determining the display mode of the first progress controls based on the number of the second media content and the association relation comprises:

determining a display number of the first progress controls based on the number of the second media content and a preset number threshold, sorting a plurality of pieces of media content based on the association relation, and generating a sorting result;

obtaining a first progress control corresponding to a plurality of pieces of successive media content corresponding to the display number according to the sorting result, wherein the plurality of pieces of successive media content comprise the first media content; and determining display progress of a current media content according to the obtained first progress control.

9. The method according to claim 8, further comprising:

displaying an associated media content control in the media content display interface in response to a number of the second media content being greater than the display number, wherein the associated media content control is configured to trigger displaying a media content list of the second media content.

10. An electronic device, comprising:

at least one processor; and a memory communicatively connected to the at least one processor, wherein the memory stores a computer program executable by the at least one processor, and the computer program, when executed by the at least one processor, causes the at least one processor to:

determine, in response to a first trigger operation of viewing first media content, whether the first media content satisfies a preset content association condition, wherein the first media content is contained in a media content stream displayed in a media content display interface;

in response to determining that the first media content satisfies the preset content association condition, display media content in the media content display interface and display a plurality of first progress controls in a preset area of the media content display interface, the media content comprises the first media content and at least one piece of second media content that is content-associated with the first media content, and wherein the plurality of first progress controls are associated with the first media content and the at least one piece of second media content and configured to indicate display progress of the first media content and the at least one piece of second media content;

in response to a first sliding operation acting on a display area of the first media content in a media content display page, switch display of the first media content in the media content display page to display of one of the at least one piece of second media content according to a sorting order of the plurality of first progress controls in the preset area, wherein the display area is different from the preset area of the media content display page;

in response to switching display of the first media content in the media content display page to display of the at least one piece of second media content, determine that the first progress control corresponding to the at least one piece of second media content is not displayed in a first position in the preset area; and move the plurality of first progress controls displayed in the preset area in a preset direction such that the first progress control corresponding to the at least one piece of second media content is displayed in the first position, and at least one first progress control that is not displayed being added into the preset area.

11. The electronic device according to claim 10, wherein the computer program, when executed by the at least one processor, further causes the at least one processor to:

determine, by a preset model, whether the first media content has the content-associated second media content, and determine that the first media content satisfies the preset content association condition in response to that the first media content has the content-associated second media content, wherein input data of the preset model comprises at least one of a poster identifier, media content posting information or media content of the first media content.

12. The electronic device according to claim 11, wherein the computer program, when executed by the at least one processor, further causes the at least one processor to:

determine, by the preset model, second media content that is content-associated with the first media content, and determining an association relation between the first media content and the second media content;

determine a display mode of the first progress controls based on a number of the second media content and the association relation; and display the at least two first progress controls in the preset area of the media content display interface according to the display mode.

13. The electronic device according to claim 12, wherein the display mode of the first progress controls comprises a display number of the first progress controls and display progress of a current media content.

14. The electronic device according to claim 13, wherein the display progress of the media content comprises at least one of:

sorting information of a first progress control corresponding to the first media content in the at least two first progress controls; or the display progress indicated by a first progress control corresponding to the media content.

15. The electronic device according to claim 12, wherein the computer program, when executed by the at least one processor, further causes the at least one processor to:

determine a display number of the first progress controls based on the number of the second media content and a preset number threshold, sort a plurality of pieces of media content based on the association relation, and generate a sorting result;

obtain a first progress control corresponding to a plurality of pieces of successive media content corresponding to the display number according to the sorting result, wherein the plurality of pieces of successive media content comprise the first media content; and determine display progress of a current media content according to the obtained first progress control.

16. The electronic device according to claim 15, wherein the computer program, when executed by the at least one processor, further causes the at least one processor to:

display an associated media content control in the media content display interface in response to the number of the second media content being greater than the display number, wherein the associated media content control is configured to trigger displaying a media content list of the second media content.

17. A non-transitory computer-readable storage medium, storing computer instructions, wherein the computer instructions, when executed by a processor, cause the processor to:

determine, in response to a first trigger operation of viewing first media content, whether the first media content satisfies a preset content association condition, wherein the first media content is contained in a media content stream displayed in a media content display interface;

in response to determining that the first media content satisfies the preset content association condition, display target media content in the media content display interface and display a plurality of first progress controls in a preset area of the media content display interface, wherein the target media content comprises the first media content and at least one piece of second media content that is content-associated with the first media content, and the plurality of first progress controls are associated with the first media content and the at least one piece of second media content and configured to indicate display progress of the first media content and the at least one piece of second media content;

in response to a first sliding operation acting on a display area of the first media content in a media content display page, switch display of the first media content in the media content display page to display of one of the at least one piece of second media content according to a sorting order of the plurality of first progress controls in the preset area wherein the display area is different from the preset area of the media content display page;

in response to switching display of the first media content in the media content display page to display of the at least one piece of second media content, determine that the first progress control corresponding to the at least one piece of second media content is not displayed in a first position in the preset area; and move the plurality of first progress controls displayed in the preset area in a preset direction such that the first progress control corresponding to the at least one piece of second media content is displayed in the first position, and at least one first progress control that is not displayed being added into the preset area.

* * * * *